United States Patent
Omori et al.

(10) Patent No.: US 7,988,577 B2
(45) Date of Patent: Aug. 2, 2011

(54) FRICTION DRIVE BELT AND METHOD FOR FABRICATING THE SAME

(75) Inventors: Manabu Omori, Kobe (JP); Hiroyuki Shiriike, Kobe (JP); Hiroyuki Tachibana, Kobe (JP)

(73) Assignee: Bando Chemical Industries, Ltd., Hyogo (JP)

( * ) Notice: Subject to any disclaimer, the term of this patent is extended or adjusted under 35 U.S.C. 154(b) by 623 days.

(21) Appl. No.: 12/091,054

(22) PCT Filed: Jul. 9, 2007

(86) PCT No.: PCT/JP2007/063687
§ 371 (c)(1),
(2), (4) Date: Apr. 21, 2008

(87) PCT Pub. No.: WO2008/007647
PCT Pub. Date: Jan. 17, 2008

(65) Prior Publication Data
US 2009/0264236 A1    Oct. 22, 2009

(30) Foreign Application Priority Data
Jul. 14, 2006  (JP) .................................. 2006-194180

(51) Int. Cl.
*F16G 1/28* (2006.01)
(52) U.S. Cl. ......... 474/249; 474/263; 474/265; 474/238
(58) Field of Classification Search ............... 474/249, 474/263, 202, 204, 237, 238, 248, 261, 262, 474/265, 269
See application file for complete search history.

(56) References Cited

U.S. PATENT DOCUMENTS

| | | | | |
|---|---|---|---|---|
| 2,054,619 A | * | 9/1936 | Freedlander | 474/249 |
| 2,181,001 A | * | 11/1939 | Smith | 474/249 |
| 2,677,969 A | * | 5/1954 | Waugh | 474/249 |
| 3,473,400 A | * | 10/1969 | Garbin et al. | 474/260 |
| 5,211,608 A | * | 5/1993 | Wong et al. | 474/202 |
| 5,215,504 A | * | 6/1993 | Wong et al. | 474/237 |
| 2010/0331129 A1 | * | 12/2010 | Mukai et al. | 474/237 |

FOREIGN PATENT DOCUMENTS

| | | |
|---|---|---|
| JP | 2000-39049 A | 2/2000 |
| JP | 2001-165244 A | 6/2001 |
| JP | 2006-64015 A | 3/2006 |

OTHER PUBLICATIONS

Office Action dated Oct. 26, 2010 issued by the Japanese Patent Office in corresponding Japanese Patent Application No. 2007-543633.
Partial English translation of JP2000-39049, Feb. 8, 2000 (1 page).

* cited by examiner

*Primary Examiner* — Michael R Mansen
*Assistant Examiner* — Juan J Campos
(74) *Attorney, Agent, or Firm* — Roberts, Mlotkowski, Safran & Cole, P.C.

(57) ABSTRACT

In a friction drive belt B, at least a contact part 13 of a belt body 10 with a pulley is made of an elastomer composition. The contact part 13 of the belt body 10 with a pulley has a large number of cellular pores 15 formed in the contact surface with the pulley.

6 Claims, 5 Drawing Sheets

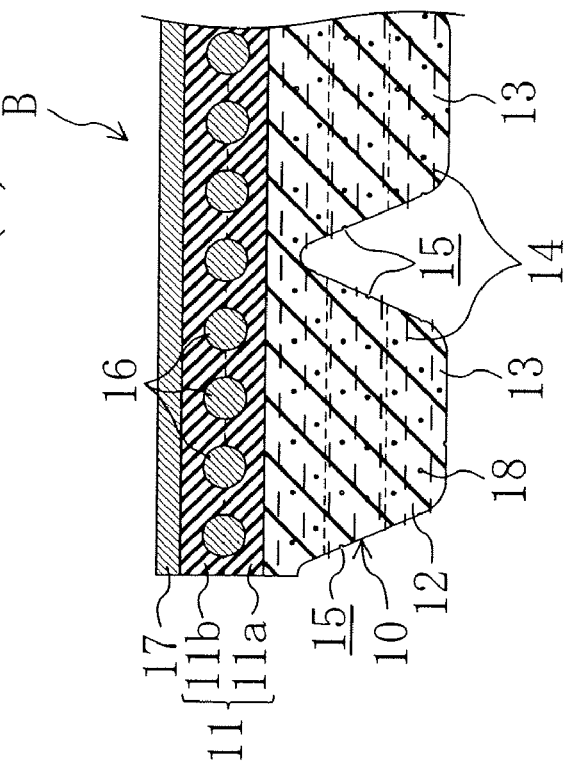
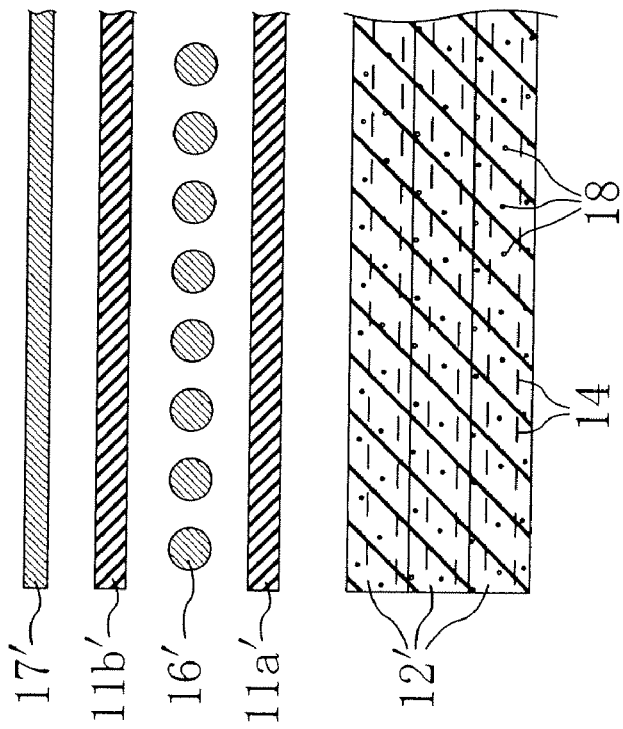
FIG. 3(a)
FIG. 3(b)

FRICTION DRIVE BELT AND METHOD FOR FABRICATING THE SAME

TECHNICAL FIELD

This invention relates to a friction drive belt in which at least a contact part of its belt body with a pulley is made of an elastomer composition and a method for fabricating the friction drive belt.

BACKGROUND ART

V-ribbed belts are widely known as friction drive belts for transmitting power of a vehicle-mounted engine to drive accessories thereof.

When such a V-ribbed belt used in an engine accessory drive system showing significant rotational variations and load is exposed to water, such as by rainfall, it may slip on the pulley to produce abnormal noise. Such production of abnormal noise can be believed to be due to the following reason: The wet belt after being exposed to water has a smaller coefficient of dynamic friction than under normal condition. When the belt condition changes from wet to dry, its coefficient of dynamic friction increases. In this case, the change from wet to dry condition rapidly and discontinuously occurs, whereby the belt has wet portions and dry portions along its circumference. Thus, a stick-slip phenomenon occurs that the belt and the pulley alternate slips and engagements between them.

Patent Document 1 discloses a V-ribbed belt in which a compression rubber layer contains cotton short fibers and para-aramid short fibers protruding from the rib side surfaces, the protruding para-aramid short fibers are fibrillated and the cotton short fibers and the para-aramid short fibers are blended at 10 to 40 parts by weight and 5 to 10 parts by weight, respectively, into 100 parts by weight of rubber of the compression rubber layer. The document describes that, according to this V-ribbed belt, when used for a motor vehicle in an engine showing significant rotational variations, the belt can prevent slight slips upon exposure to water to avoid noise production.

Since, however, the V-ribbed belt disclosed in Patent Document 1 contains a large amount of short fibers, this gives the belt itself a high rigidity, which makes it easier for a slip to occur on the belt rather than makes it harder.

Patent Document 1: Published Japanese Patent Application No. 2001-165244

DISCLOSURE OF THE INVENTION

An aspect of the present invention is a friction drive belt in which at least a contact part of a belt body with a pulley is made of an elastomer composition, wherein the contact part of the belt body with a pulley has a large number of cellular pores formed in the contact surface with the pulley.

Furthermore, another aspect of the present invention is a method for fabricating a friction drive belt whose belt body is made of an elastomer composition, the method including the steps of: hot molding an elastomer composition in which hollow particles are blended, thereby forming a belt body preform; and cutting the formed belt body preform to form a contact part of the belt body with a pulley.

According to the above aspects of the present invention, since a large number of cellular pores are formed in the contact surface of the contact part of the belt body with a pulley, this prevents the occurrence of abnormal noise when the belt is exposed to water.

BRIEF DESCRIPTION OF DRAWINGS

FIG. 3 shows diagrams illustrating a method for fabricating a V-ribbed belt.

BEST MODE FOR CARRYING OUT THE INVENTION

An embodiment of the present invention will be described below in detail with reference to the drawings.

Figure 1:
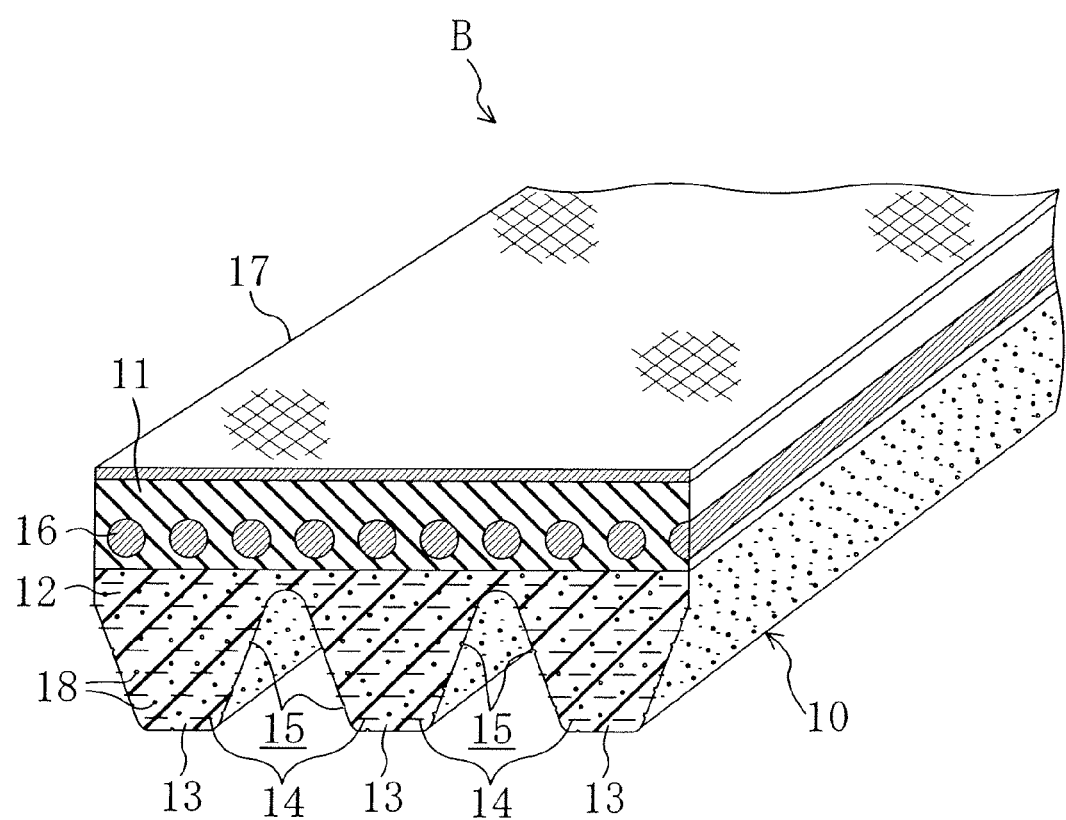
FIG. 1 is a perspective view of a V-ribbed belt.

FIG. 1 shows a V-ribbed belt B (friction drive belt) according to this embodiment. The V-ribbed belt B is used, for example, to transmit power from a motor vehicle engine to engine accessories to drive them and formed with a length of 1000 to 2500 mm, a width of 10 to 20 mm and a thickness of 4.0 to 5.0 mm.

The V-ribbed belt B includes a V-ribbed belt body 10 formed in a double layered structure including an adhesion rubber layer 11 forming an outer part and a ribbed rubber layer 12 forming an inner part. A reinforcement fabric 17 is adhered to the outer face of the V-ribbed belt body 10. Furthermore, the adhesion rubber layer 11 has a cord 16 embedded therein in a spiral with a certain pitch in the belt widthwise direction.

The adhesion rubber layer 11 is formed in the shape of a strip of long rectangular cross section and has a thickness of 1.0 to 2.5 mm, for example. The adhesion rubber layer 11 is made of an elastomer composition in which various compounding ingredients are blended into a base elastomer. Examples of the base elastomer include ethylene-propylene-diene monomer (EPDM), chloroprene rubber (CR) and hydrogenated acrylonitrile-butadiene rubber (H-NBR). Examples of the compounding ingredients include crosslinkers, antioxidants, processing aids, plasticizers, reinforcers and fillers. The elastomer composition forming the adhesion rubber layer 11 is obtained by blending compounding ingredients into a base elastomer and kneading them to form an uncrosslinked elastomer composition and crosslinking the uncrosslinked elastomer composition by application of heat and pressure.

The ribbed rubber layer 12 is formed so that a plurality of ribs 13 forming a contact part with a pulley extend inward. The plurality of ribs 13 are each formed into a circumferentially extending rib of substantially inverted triangular cross section and are arranged in parallel with each other in the belt widthwise direction. Each rib 13 is formed, for example, with a rib height of 2.0 to 3.0 mm and a width of 1.0 to 3.6 mm between its root ends. The number of ribs is three to six, for example, (three in FIG. 1).

The ribbed rubber layer 12 is made of an elastomer composition in which various compounding ingredients are blended into a base elastomer. Examples of the base elastomer include ethylene-propylene-diene monomer (EPDM), chloroprene rubber (CR) and hydrogenated acrylonitrile-butadiene rubber (H-NBR). Examples of the compounding ingredients include crosslinkers, antioxidants, processing aids, plasticizers, reinforcers, fillers, short fibers 14 and hollow particles 18. The elastomer composition forming the ribbed rubber layer 12 is obtained by blending compounding ingredients into a base elastomer and kneading them to form an uncrosslinked elastomer composition and crosslinking the uncrosslinked elastomer composition by application of heat and pressure.

The short fibers 14, which are blended into the elastomer composition forming the ribbed rubber layer 12, are oriented in the belt widthwise direction. Out of the short fibers 14, those exposed at the contact surface with a pulley, i.e., at the rib surfaces, protrude beyond the rib surfaces. Examples of such short fibers 14 include aramid fibers, polyester fibers and cotton fibers. The short fibers 14 have a length of 0.2 to 3.0 mm, for example, and are blended by 3 to 30 parts by mass with respect to 100 parts by mass of the base elastomer.

Figure 2:
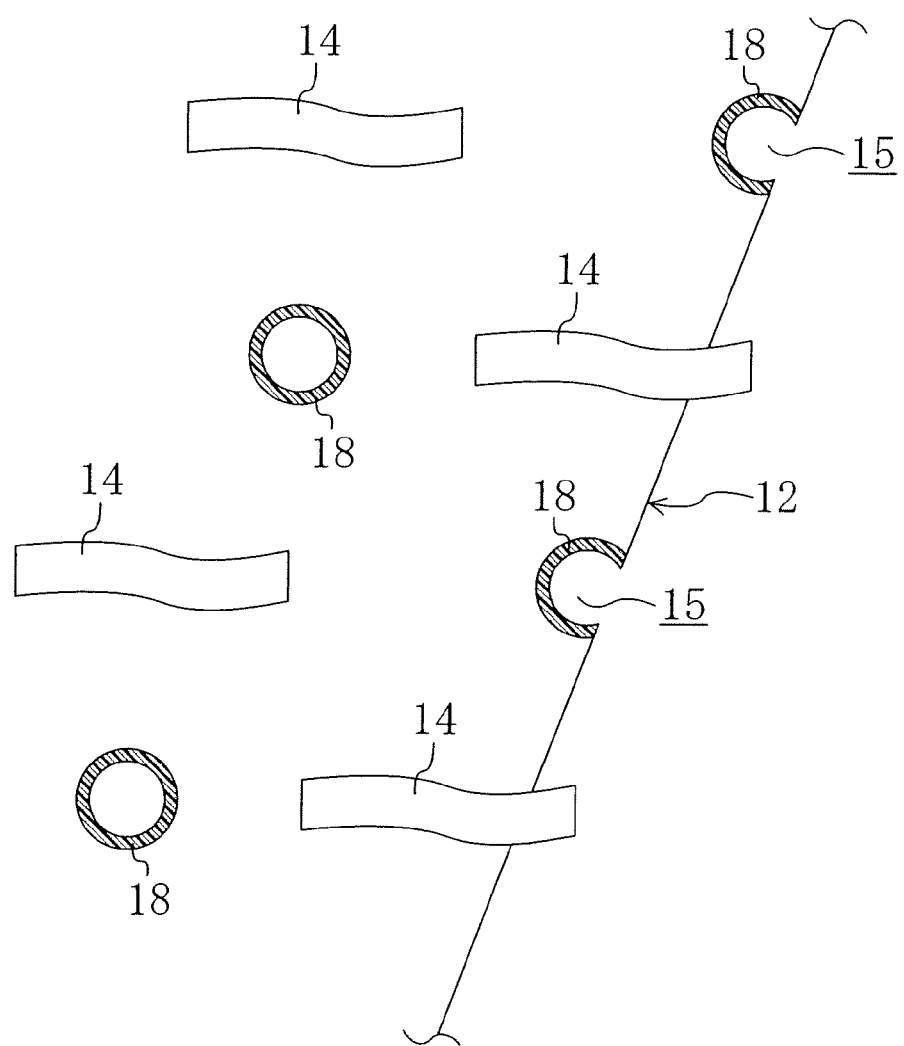
FIG. 2 is an enlarged cross-sectional view of a rib.

The hollow particles 18 are blended into the elastomer composition forming the ribbed rubber layer 12. Out of the hollow particles 18, those exposed at the rib surfaces, i.e., at the contact surface with a pulley, are partially cut away to form a large number of cellular pores 15 in the rib surfaces. The cellular pores 15 are micropores opening at the rib surfaces as shown in FIG. 2, preferably have an average pore size of 3 to 60 μm and more preferably have an average pore size of 3 to 30 μm. Examples of such hollow particles 18 include EHM303 and EMS-022 made by Japan Fillite Co., Ltd., hollow particles of acrylonitrile copolymers 092-40 and 092-120 made by Sekisui Chemical Co., Ltd. and Washin Microcapsule made by Washin Chemical Industry Co., Ltd. The hollow particles 18 has a particle size of preferably 2 to 38 μm and more preferably 2 to 17 μm. Furthermore, the hollow particles 18 are blended preferably by 1 part by mass inclusive to 15 parts by mass exclusive, more preferably by 5 to 10 parts by mass both inclusive, with respect to 100 parts by mass of base elastomer.

The reinforcement fabric 17 is composed of a woven fabric 17' made of warp and weft yarns of polyester fibers or cotton fibers, such as by plain weaving. In order to give the reinforcement fabric 17 an adhesiveness to the V-ribbed belt body 10, the reinforcement fabric 17 is subjected, prior to molding, to a treatment of dipping it in an aqueous solution of resorcinol-formaldehyde latex (hereinafter, referred to as an RFL aqueous solution) and then heating it and a treatment of coating rubber cement on its surface facing the V-ribbed belt body 10 and then drying it.

The cord 16 is composed of a twisted yarn 16' of aramid fibers or polyester fibers. In order to give the cord 16 an adhesiveness to the V-ribbed belt body 10, the cord 16 is subjected, prior to molding, to a treatment of dipping it in an RFL aqueous solution and then heating it and a treatment of dipping the cord 16 in rubber cement and then drying it.

Next, a description is given of a method for fabricating the V-ribbed belt B with reference to FIG. 3.

In fabricating a V-ribbed belt B, an inner mold having a molding surface for forming the belt back face into a predetermined shape and a rubber sleeve having a molding surface for forming the belt inner face into a predetermined shape are used for the outer and inner peripheries, respectively, of the V-ribbed belt B.

The outer periphery of the inner mold is first covered with a woven fabric 17' serving as a reinforcement fabric 17 and an uncrosslinked rubber sheet 11b' for forming an outside part 11b of the adhesion rubber layer 11 is then wrapped around the reinforcement fabric 17.

Subsequently, a twisted yarn 16' serving as a cord 16 is wound in a spiral form around the uncrosslinked rubber sheet 11b', another uncrosslinked rubber sheet 11a' for forming an inside part 11a of the adhesion rubber layer 11 is then wrapped around the cord-wound uncrosslinked rubber sheet 11b', and still another uncrosslinked rubber sheet 12' for forming a ribbed rubber layer 12 is then wrapped around the uncrosslinked rubber sheet 11a'. In this case, a material used as the uncrosslinked rubber sheet 12' for forming the ribbed rubber layer 12 is an elastomer composition in which short fibers 14 oriented in the direction orthogonal to the wrapping direction and hollow particles 18 are blended. The uncrosslinked rubber sheet 12' is preferably an uncrosslinked rubber sheet in which hollow particles 18 are blended by 1 part by mass inclusive to 15 parts by mass exclusive into 100 parts by mass of base elastomer or more preferably an uncrosslinked rubber sheet in which hollow particles 18 are blended by 5 to 10 parts by mass both inclusive into 100 parts by mass of base elastomer.

Thereafter, the rubber sleeve is fitted onto the molding article on the inner mold and they are placed into a molding pan. Then, the inner mold is heated as by hot steam and a high pressure is applied to the rubber sleeve to press it radially inwardly. During the time, the rubber component fluidizes, a crosslinking reaction proceeds and adhesion reactions of the twisted yarn 16' and the woven fabric 17' to the rubber also proceed. Furthermore, the hollow particles 18 expand by volatilization of pentane and hexane contained therein to form a large number of fine hollow parts inside the molding article. Thus, a cylindrical belt slab (belt body preform) is molded.

Then, the belt slab is removed from the inner mold and separated at different locations of the length into several pieces, and the outer periphery of each separated piece is ground to form ribs 13, i.e., a contact part of the belt. During the time, the hollow particles 18 exposed at the contact surface of the belt are partially cut away to open, thereby forming cellular pores 15 in the contact surface of the belt.

Finally, the separated belt slab piece having ribs 13 formed on the outer periphery is sliced in pieces of predetermined width and each sliced piece is turned inside out to provide a V-ribbed belt B.

Figure 4:
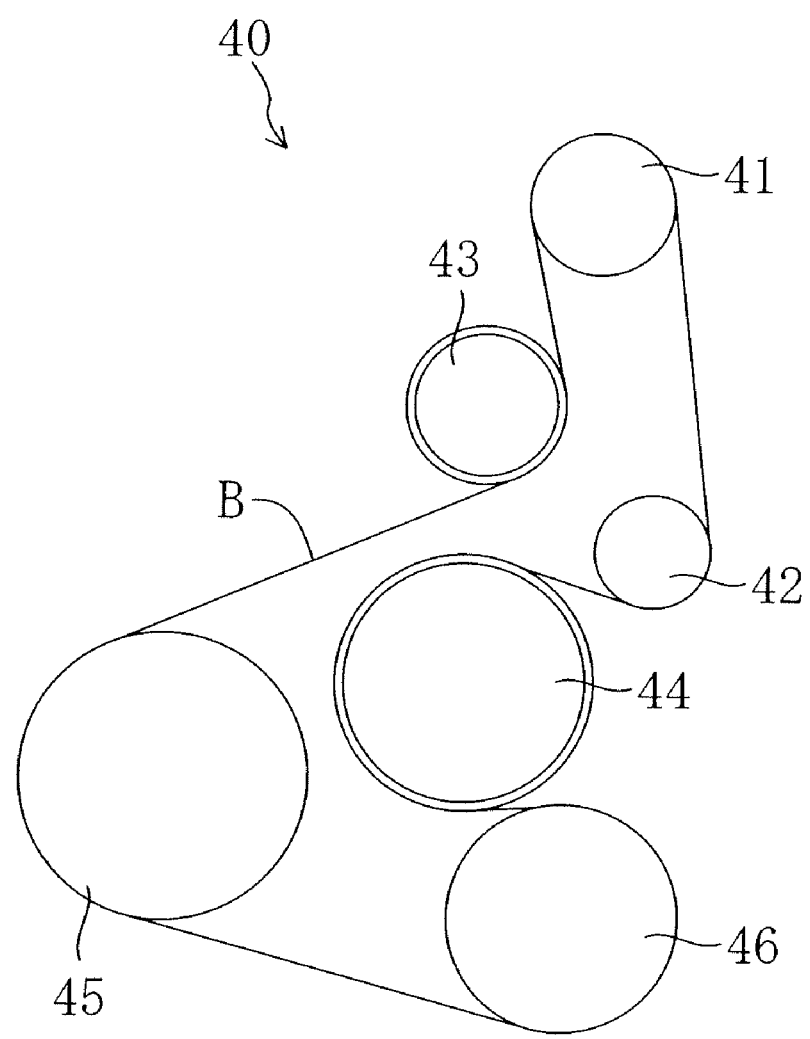
FIG. 4 is a diagram showing a layout of pulleys in an accessory drive belt drive system.

FIG. 4 shows a layout of pulleys in a serpentine accessory drive belt drive system 40 using a V-ribbed belt B for a motor vehicle engine.

The layout of the accessory drive belt drive system 40 includes an uppermost power steering pulley 41, an AC generator pulley 42 disposed below the power steering pulley 41, a flat tensioner pulley 43 disposed downwardly leftward of the power steering pulley 41, a flat water pump pulley 44 disposed below the tensioner pulley 43, a crankshaft pulley 45 disposed downwardly leftward of the tensioner pulley 43 and an air-conditioner pulley 46 disposed downwardly rightward of the crankshaft pulley 45. Out of these pulleys, all the pulleys other than the tensioner pulley 43 and the water pump pulley 44, which are flat pulleys, are ribbed pulleys. The V-ribbed belt B is arranged by being wrapped around the power steering pulley 41 to allow its ribs 13 to come into contact with the power steering pulley 41, then wrapped around the tensioner pulley 43 to allow its back face to come into contact with the tensioner pulley 43, then sequentially wrapped around the crankshaft pulley 45 and the air-conditioner pulley 46 to allow its ribs 13 to come into contact with these pulleys, then wrapped around the water pump pulley 44 to allow its back face to come into contact with the water pump pulley 44, then wrapped around the AC generator pulley 42 to allow its ribs 13 to come into contact with the AC generator pulley 42, and then returned to the power steering pulley 41.

According to the V-ribbed belt B having the above configuration, since a large number of cellular pores 15 are formed in the surfaces of the ribs 13 of the V-ribbed belt body 10, i.e., in the contact surface of the contact part with a pulley, the occurrence of abnormal noise can be prevented even if the belt is exposed to water while being used, for example, in an automotive accessory drive belt drive system as described above. The reason for this can be inferred as follows: Water interposed between the belt and the pulley is first taken into the cellular pores 15 and then rapidly drained off, whereby the belt condition continuously changes from wet to dry. Therefore, the belt does not have wet portions and dry portions at the same time and can keep its condition uniform along the circumference, which prevents the occurrence of a stick-slip phenomenon.

Although in the above embodiment the V-ribbed belt B is used as an example of a friction drive belt according to the present invention, the friction drive belt according to the present invention is not particularly limited to V-ribbed belts and may be other types of friction drive belts, such as V-belts.

EXAMPLES

Belts for Test Evaluation

The following V-ribbed belts of Examples 1 to 9 and Comparative Example were fabricated. The compositions of these V-ribbed belts are also shown in Table 1.

Example 1

As Example 1, a V-ribbed belt was fabricated in which ethylene-propylene-diene monomer (EPDM) (Product Name: Nordel IP4640, made by DuPont Dow Elastomers LLC) was used as a base elastomer and a ribbed rubber layer is formed using an uncrosslinked elastomer composition obtained by blending 70 parts by mass of two types of carbon black, HAF40 (Product Name: Seast 3, made by Tokai Carbon Co., Ltd.) and FEF30 (Product Name: HTC #100, made by Nippon Steel Chemical Carbon Co., Ltd.), 12 parts by mass of softener (Product Name: Sunpar 2280, made by Japan Sun Oil Co., Ltd.), 3 parts by mass of zinc oxide (Product Name: Aenka #3, made by Sakai Chemical Industry Co., Ltd.), 1 part by mass of stearic acid (Product Name: stearic acid, made by Kao Corporation), 3 parts by mass of dicumyl peroxide (crosslinker) (Product Name: Percumyl D, made by NOF corporation), 20 parts by mass of nylon short fibers (Product Name: Leona 66, Fiber Length: 1 mm, made by Toray Industries, Inc.) and 1 part by mass of hollow particles A (Product Name: 092-40, Particle Size: 10-17 µm, made by Japan Fillite Co., Ltd.) into 100 parts by mass of EPDM and kneading them.

The adhesion rubber layer, the reinforcement fabric and the cord are composed of an elastomer composition using EPDM, woven fabric made of nylon fibers and a twisted yarn made of polyethylene naphthalate fibers (PEN), respectively. The belt length was 2280 mm, the belt width was 25 mm and the belt thickness was 4.3 mm. The number of ribs was six.

Example 2

As Example 2, a V-ribbed belt was fabricated with the same configuration as Example 1 except that the amount of hollow particles A blended into the uncrosslinked elastomer composition was 5 parts by mass.

Example 3

As Example 3, a V-ribbed belt was fabricated with the same configuration as Example 1 except that the amount of hollow particles A blended into the uncrosslinked elastomer composition was 10 parts by mass.

Example 4

As Example 4, a V-ribbed belt was fabricated with the same configuration as Example 1 except that the amount of hollow particles A blended into the uncrosslinked elastomer composition was 15 parts by mass.

Example 5

As Example 5, a V-ribbed belt was fabricated with the same configuration as Example 1 except that an uncrosslinked elastomer composition was obtained by blending, in place of hollow particles A, 10 parts by mass of hollow particles B (Product Name: EHM303, Particle Size: 24-34 µm, made by Sekisui Chemical Co., Ltd.) into 100 parts by mass of base elastomer.

Example 6

As Example 6, a V-ribbed belt was fabricated with the same configuration as Example 1 except that an uncrosslinked elastomer composition was obtained by blending, in place of hollow particles A, 10 parts by mass of hollow particles C (Product Name: EMS-022, Particle Size: 25-35 µm, made by Sekisui Chemical Co., Ltd.) into 100 parts by mass of base elastomer.

Example 7

As Example 7, a V-ribbed belt was fabricated with the same configuration as Example 1 except that the amount of hollow particles A blended into the uncrosslinked elastomer composition was 20 parts by mass.

Example 8

As Example 8, a V-ribbed belt was fabricated with the same configuration as Example 1 except that an uncrosslinked elastomer composition was obtained by blending, in place of hollow particles A, 10 parts by mass of hollow particles D (Product Name: 092-120, Particle Size: 28-38 µm, made by Japan Fillite Co., Ltd.) into 100 parts by mass of base elastomer.

Example 9

As Example 9, a V-ribbed belt was fabricated with the same configuration as Example 1 except that an uncrosslinked elastomer composition was obtained by blending, in place of hollow particles A, 10 parts by mass of hollow particles E (Product Name: Washin Microcapsule, Particle Size: 2-5 µm, made by Washin Chemical Industry Co., Ltd.) into 100 parts by mass of base elastomer.

Comparative Example

As Comparative Example, a V-ribbed belt was fabricated with the same configuration as Example 1 except that no hollow particles are blended into the uncrosslinked elastomer composition.

TABLE 1

|  | Example 1 | Example 2 | Example 3 | Example 4 | Example 5 | Example 6 | Example 7 | Example 8 | Example 9 | Comp. Ex. |
|---|---|---|---|---|---|---|---|---|---|---|
| EPDM | 100 | 100 | 100 | 100 | 100 | 100 | 100 | 100 | 100 | 100 |
| Carbon black | 70 | 70 | 70 | 70 | 70 | 70 | 70 | 70 | 70 | 70 |
| Softener | 12 | 12 | 12 | 12 | 12 | 12 | 12 | 12 | 12 | 12 |
| Zinc oxide | 3 | 3 | 3 | 3 | 3 | 3 | 3 | 3 | 3 | 3 |
| Stearic acid | 1 | 1 | 1 | 1 | 1 | 1 | 1 | 1 | 1 | 1 |
| Dicumyl peroxide | 3 | 3 | 3 | 3 | 3 | 3 | 3 | 3 | 3 | 3 |
| Nylon short fibers | 20 | 20 | 20 | 20 | 20 | 20 | 20 | 20 | 20 | 20 |
| Hollow particles A (10-17 μm) | 1 | 5 | 10 | 15 | 0 | 0 | 20 | 0 | 0 | 0 |
| Hollow particles B (24-34 μm) | 0 | 0 | 0 | 0 | 10 | 0 | 0 | 0 | 0 | 0 |
| Hollow particles C (25-35 μm) | 0 | 0 | 0 | 0 | 0 | 10 | 0 | 0 | 0 | 0 |
| Hollow particles D (28-38 μm) | 0 | 0 | 0 | 0 | 0 | 0 | 0 | 10 | 0 | 0 |
| Hollow particles E (2-5 μm) | 0 | 0 | 0 | 0 | 0 | 0 | 0 | 0 | 10 | 0 |
| Bending modulus of Elasticity (MPa) | 50 | 48 | 48 | 46 | 40 | 35 | 38 | 15 | 50 | 50 |
| Time to crack occurrence (hours) | 503 | 511 | 509 | 525 | 546 | 580 | 473 | 648 | 510 | 506 |
| Average pore size of cellular pores (μm) | 15 | 15 | 15 | 15 | 30 | 60 | 15 | 90 | 3 | — |
| Decrease in frictional force after water exposure | 0.25 | 0.10 | 0.02 | 0.01 | 0.02 | 0.03 | 0.10 | 0.05 | 0.02 | 0.30 |
| Sound production after water exposure | small | none | none | faint | none | mid | small | mid | none | large |

Test Evaluation Method

<Bending Modulus of Elasticity of Belt>

In conformity to JIS K6911, a test piece of 80 mm length, 10 mm width and 4 mm thickness was cut out of each belt of Examples 1 to 9 and Comparative Example and measured in terms of bending modulus of elasticity under conditions of a span of 60 mm and a loading speed of 2 mm/min.

<Belt Endurance Running Test>

Figure 5:
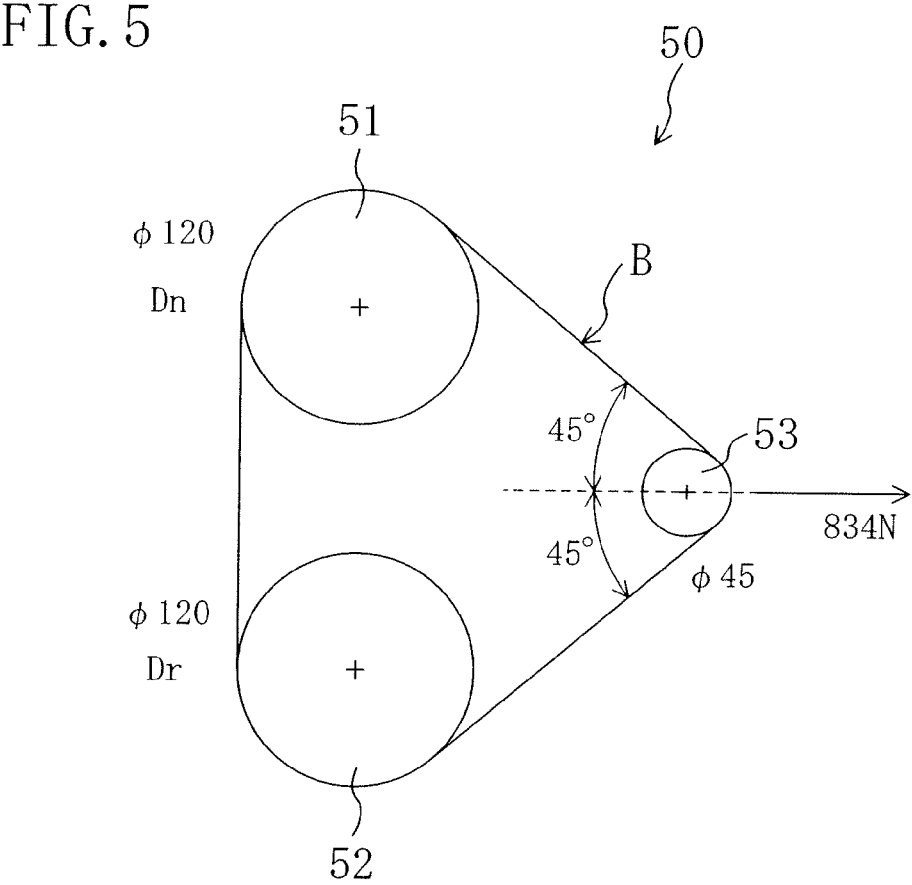
FIG. 5 is a diagram showing a layout of pulleys in a belt running tester for endurance evaluation.

FIG. 5 shows a layout of pulleys in a belt running tester 50 for evaluating the endurance of the V-ribbed belt B.

The belt running tester 50 is composed of large-diameter ribbed pulleys 51 and 52 of 120 mm diameter disposed at upper and lower positions (upper one is a driven pulley and lower one is a drive pulley) and a small-diameter ribbed pulley 53 of 45 mm diameter disposed vertically midway between the large-diameter ribbed pulleys and to the right of them. The small-diameter ribbed pulley 53 is placed to have a total arc of contact of 90° with the belt.

Each V-ribbed belt B of Examples 1 to 9 and Comparative Example was wrapped around the three ribbed pulleys 51-53, and the small-diameter ribbed pulley 53 was pulled sideways so that a set weight of 834 N was imposed on the V-ribbed belt B. In this state, a belt running test was carried out by rotating the lower ribbed pulley 52 serving as a drive pulley at 4900 rpm under an ambient temperature of 23° C. Then, the time to occurrence of a crack in any of the rib surfaces was measured.

<Average Pore Size of Cellular Pores>

For each of Embodiments 1 to 9, the surface of a rib top and the surface of a rib side were observed by optical microscopy, 50 to 70 cellular pores in each of the surfaces were measured in terms of aperture size, and the average value of the aperture sizes was assumed to be the average pore size.

<Change in Coefficient of Dynamic Friction>

Figure 6:
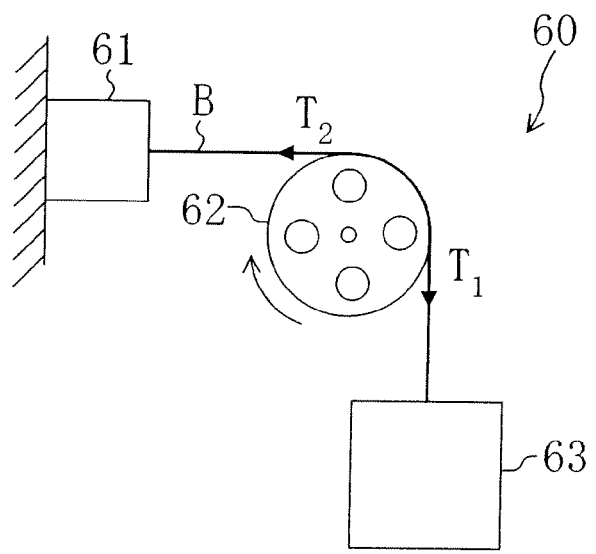
FIG. 6 is a diagram showing the structure of a coefficient-of-dynamic-friction measurement system.

FIG. 6 shows the structure of a coefficient-of-dynamic-friction measurement system 60 for the V-ribbed belt B.

The coefficient-of-dynamic-friction measurement system 60 is composed of a load cell 61 fixedly attached to a vertical wall and a ribbed pulley 62 disposed sideways of the load cell 61.

A strip-shaped test piece of 1170 mm length was cut out of each of the V-ribbed belts B of Embodiments 1 to 9 and Comparative Example, fixed at one end to the load cell 61, then pulled horizontally, then wrapped around the ribbed pulley 62 and then given a load of 17.2 N by suspending a weight 63 of 1.75 kg from the other end. In this state, the ribbed pulley 62 was rotated at 20 rpm in a direction to pull the load cell 61. One minute after the start of rotation, water was dropped to 120 ml/min on the ribbed pulley 62. In this state, the test piece was measured in terms of change in coefficient of dynamic friction with time. Then, the difference between the coefficient of dynamic friction under a dry condition and the coefficient of dynamic friction under a wet condition was found. The coefficient of dynamic friction was calculated based on the following equation:

$$\mu' = \ln(T_2/T_1)(\pi/2)$$ [Equation 1]

where $T_1$ is a tension produced in the belt by the weight and $T_2$ is a tension of the belt measured by the load cell.

<Sound Pressure after Exposure to Water>

The V-ribbed belt of each of Embodiments 1 to 9 and Comparative Example was fitted to an accessory drive belt drive system for a motor vehicle engine showing significant rotational variations and a significant load. While water of 120 ml/min was dropped on the V-ribbed belt with the engine idling, the V-ribbed belt was measured in terms of sound pressure. Then, sound pressures not smaller than 90 dB were evaluated as "large", sound pressures not smaller than 80 dB but smaller than 90 dB as "mid", sound pressures not smaller than 75 dB but smaller than 80 dB as "small", sound pressures not smaller than 70 dB but smaller than 75 dB as "faint", and sound pressures smaller than 70 dB as "none". The reason why the measurement was carried out with the engine idling is that sound is produced most significantly at low engine speed.

Test Evaluation Results

The results of the test evaluation are shown in Table 1.

The results shows that Examples 1 to 9, which have a ribbed rubber layer made of a hollow particle-blended elastomer composition and having a large number of cellular pores formed in the rib surfaces, exhibited higher sound pressures after exposure to water than Comparative Example, which have a ribbed rubber layer made of an elastomer composition containing no hollow particles and having no cellular pores formed in the rib surfaces. The reason for this can be inferred as follows: In Comparative Example, the change from wet to dry condition rapidly and discontinuously occurred, whereby the belt had wet portions and dry portions along its circumference. Thus, a stick-slip phenomenon occurred that the belt and the pulley alternated slips and engagements between them. On the other hand, in Examples 1 to 9, water interposed between the belt and the pulley was first taken into the cellular pores and then rapidly drained off, whereby the belt condition continuously changed from wet to dry. Therefore, the belt did not have wet portions and dry portions at the same time and could keep its condition uniform along the circumference, which prevented the occurrence of a stick-slip phenomenon.

Furthermore, the test results show that Embodiments 1 to 9 exhibited smaller decease in coefficient of dynamic friction after exposure to water than Comparative Example. This can be also believed to be due to that in Embodiments 1 to 9, water interposed between the belt and the pulley was taken into cellular pores and then rapidly drained out.

Comparison of Examples 1 to 4 and Example 7 having different blending amounts of hollow particles A shows the following: When the blending amount of hollow particles A is within the range of 1 part by mass inclusive to 15 parts by mass exclusive with respect to 100 parts by mass of base elastomer, the sound pressure of the belt after exposure of water decreases as the blending amount increases. However, as the blending amount of hollow particles A increases to or above 15 parts by mass, there is a tendency for the sound pressure to gradually increase. Furthermore, the comparison also shows that the tendency of decrease in coefficient of dynamic friction after exposure of water corresponds to the above. Therefore, the blending amount of hollow particles is preferably 1 part by mass inclusive to 15 parts by mass exclusive with respect to 100 parts by mass of base elastomer.

Furthermore, comparison of Examples 1 to 4 and Example 7 shows that the belt flexural rigidity became lower as the amount of hollow particles A blended into 100 parts by mass of base elastomer increased. This can be believed to be due to that hollow parts formed in the ribbed rubber layer by hollow particles accounted for decrease of belt flexural rigidity and, therefore, larger blending amount of hollow particles provided larger occupied volume of hollow parts and more significantly decreased the belt flexural rigidity.

Furthermore, the above comparison also shows the following: In Examples 1 to 4, the belt running endurance increased with decreasing belt flexural rigidity. On the other hand, in Example 7, in spite of a lower belt flexural rigidity than Examples 1 to 4, the belt running endurance was low. This can be believed to be due to that since in Example 7 the large blending amount of hollow particles provided short distances between hollow parts and between cellular pores in the ribbed rubber layer as compared with Examples 1 to 4, cracks became likely to occur between them.

Comparison of Examples 3, 5, 6, 8 and 9 different in the type of hollow particles only shows that the average pore size of cellular pores increases in order of hollow particles E, A, B and D, larger average pore size provided lower belt flexure rigidity, and larger average pore size provided higher belt running endurance although Embodiment 9 using hollow particles E exhibited a slightly higher belt running endurance than Embodiment 3 using hollow particles A. However, the comparison also shows that as the average pore size of cellular pores increases, the sound pressure after exposure of water becomes higher. Furthermore, the comparison also shows that the tendency of decrease in coefficient of dynamic friction after exposure of water corresponds to the above. Based on the above results, it can be believed that from the viewpoint of decreasing the sound pressure after exposure of water to a low level, the average pore size of cellular pores is preferably 3 to 30 µm.

INDUSTRIAL APPLICABILITY

The present invention is useful for a friction drive belt in which at least a contact part of its belt body with a pulley is made of an elastomer composition and a method for fabricating the friction drive belt.

The invention claimed is:

1. A friction drive belt in which at least a contact part of a belt body with a pulley is made of an elastomer composition in which hollow particles are blended, wherein the contact part of the belt body with the pulley has a large number of isolated cellular pores formed in a contact surface with the pulley wherein the pores are defined by the interiors of open hollow particles molded into the contact part.

2. The friction drive belt of claim 1, wherein the cellular pores have an average pore size of 3 to 60 µm.

3. The friction drive belt of claim 2, wherein the cellular pores have an average pore size of 3 to 30 µm.

4. The friction drive belt of claim 1, wherein the belt body is the body of a V-ribbed belt.

5. A method for fabricating a friction drive belt whose belt body is made of an elastomer composition, the method comprising the steps of: hot molding an elastomer composition in which hollow particles are blended, thereby forming a belt body perform, and cutting the formed belt body perform, and partially cutting away the hollow particles blended in the elastomer composition to form a contact part of the belt body with a pulley, the contact part of the belt body with the pulley having a contact surface with the pulley on which a large number of isolated cellular pores are defined by the interiors of open hollow particles molded into the contact part.

6. The method for fabricating a friction drive belt of claim 5, wherein the elastomer composition is preferably an elastomer composition in which the hollow particles are blended by 1 part by mass inclusive to 15 parts by mass exclusive into 100 parts by mass of base elastomer.

* * * * *